United States Patent
Tichy

(10) Patent No.: US 7,611,122 B2
(45) Date of Patent: Nov. 3, 2009

(54) CLOSURE DEVICE FOR THE VACUUM-TIGHT CLOSING OF AN OPENING IN A WALL

(75) Inventor: Thomas Tichy, Feldkirch (AT)

(73) Assignee: VAT Holding AG, Haag (CH)

( * ) Notice: Subject to any disclaimer, the term of this patent is extended or adjusted under 35 U.S.C. 154(b) by 337 days.

(21) Appl. No.: 11/751,764

(22) Filed: May 22, 2007

(65) Prior Publication Data

US 2007/0272888 A1    Nov. 29, 2007

(30) Foreign Application Priority Data

May 24, 2006    (AT)    ............................... A 902/2006

(51) Int. Cl.
*F16K 25/00*    (2006.01)

(52) U.S. Cl. .................. 251/193; 251/158; 251/326

(58) Field of Classification Search ............... 251/158, 251/175, 193, 62, 326
See application file for complete search history.

(56) References Cited

U.S. PATENT DOCUMENTS

| | | | |
|---|---|---|---|
| 2,472,525 A | | 6/1949 | Edwards |
| 3,368,792 A | * | 2/1968 | Schertler .................. 251/158 |
| 6,056,266 A | | 5/2000 | Blecha |
| 6,899,316 B2 | * | 5/2005 | Duelli ..................... 251/158 |
| 7,422,653 B2 | * | 9/2008 | Blahnik et al. ......... 156/345.32 |
| 7,494,107 B2 | * | 2/2009 | Sheydayi et al. ........... 251/63.5 |

FOREIGN PATENT DOCUMENTS

| | | |
|---|---|---|
| DE | 197 46 241 | 5/1999 |
| FR | 1.196.093 | 11/1959 |
| JP | 2003-148635 | 5/2003 |

* cited by examiner

*Primary Examiner*—John K Fristoe, Jr.
(74) *Attorney, Agent, or Firm*—Reed Smith LLP

(57) ABSTRACT

A closure device for closing an opening in a wall in a vacuum-tight manner comprises a closure plate, a carrying unit which carries the closure plate and which has at least one longitudinal piston-cylinder unit, and a base unit which carries the carrying unit and has at least one transverse piston-cylinder unit. A closing cylinder space of the at least one longitudinal piston-cylinder unit is connected to a closing cylinder space of the transverse piston-cylinder unit, or of at least one of the transverse piston-cylinder units, by means of a closing pressure gas channel, and an opening cylinder space of the at least one longitudinal piston-cylinder unit is connected to an opening cylinder space of the transverse piston-cylinder unit, or of at least one of the transverse piston-cylinder units, by means of an opening pressure gas channel. The closing cylinder spaces and the opening cylinder spaces of the transverse piston-cylinder unit and longitudinal piston-cylinder unit are acted upon by pressure for closing the closure device, and only the opening cylinder spaces of the transverse piston-cylinder unit and longitudinal piston-cylinder unit are acted upon by pressure for opening the closure device. The closing piston surface of the at least one transverse piston-cylinder unit is greater than the opening piston surface of the at least one transverse piston-cylinder unit, and the closing piston surface of the at least one longitudinal piston-cylinder unit is greater than the opening piston surface of the at least one longitudinal piston-cylinder unit. The ratio between the closing piston surface and the opening piston surface of the at least one transverse piston-cylinder unit is greater than the ratio between the closing piston surface and the opening piston surface of the at least one longitudinal piston-cylinder unit.

12 Claims, 3 Drawing Sheets

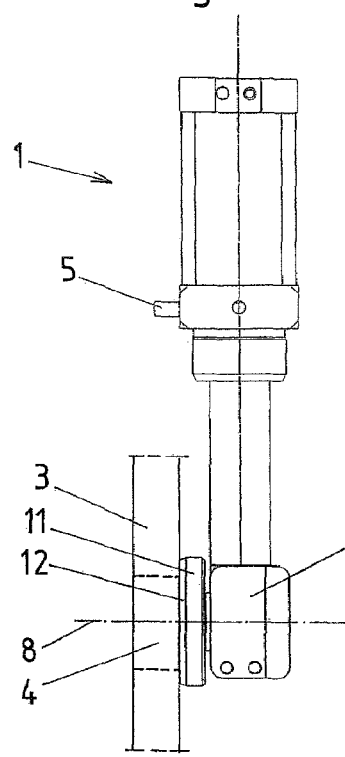
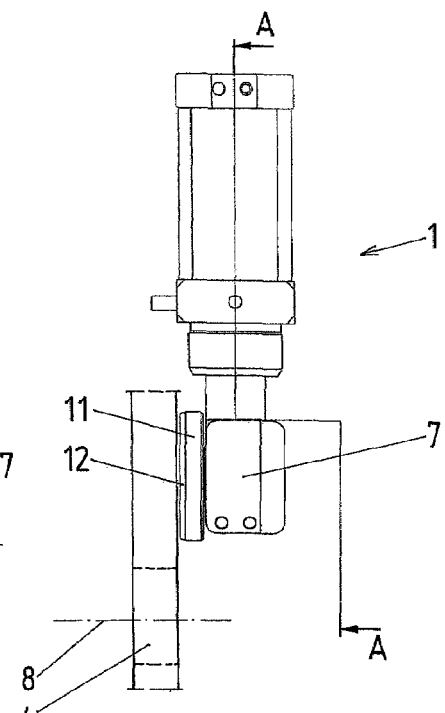
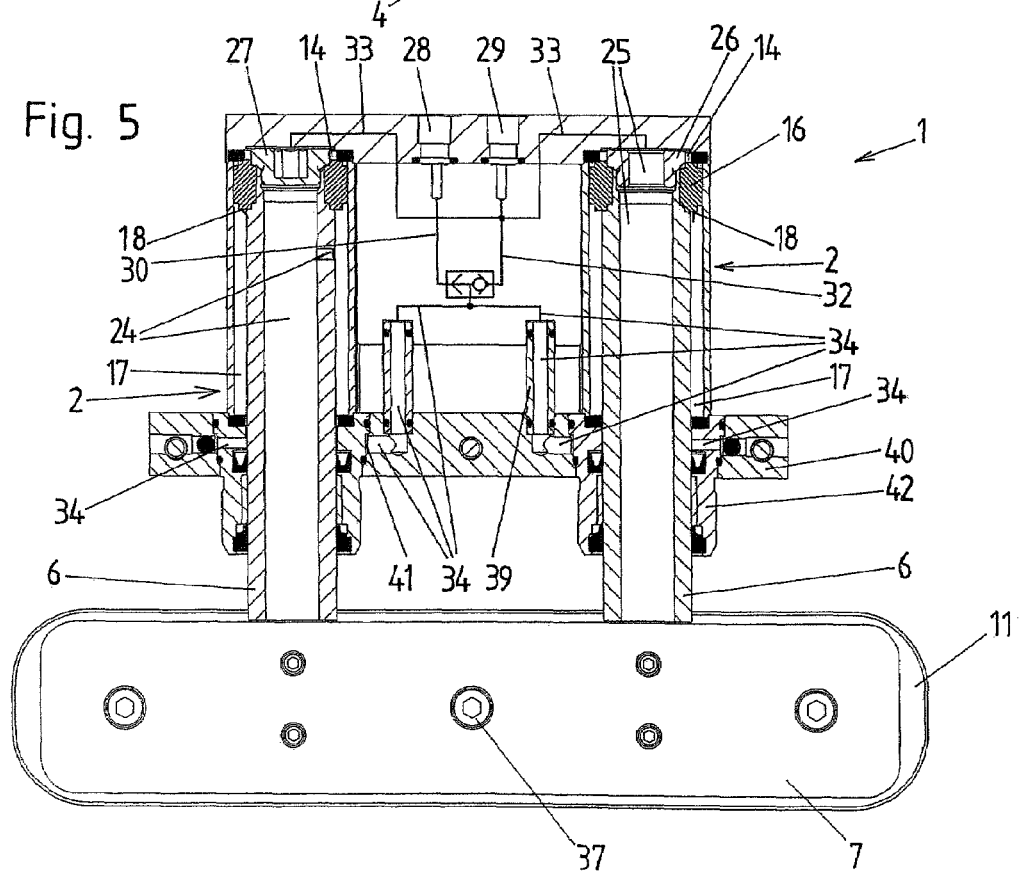

CLOSURE DEVICE FOR THE VACUUM-TIGHT CLOSING OF AN OPENING IN A WALL

CROSS-REFERENCE TO RELATED APPLICATION

This application claims priority of Austrian Application No. A 902/2006, filed May 24, 2006, the complete disclosure of which is hereby incorporated by reference.

BACKGROUND OF THE INVENTION a) Field of the Invention

The invention is directed to a closure device for closing an opening in a wall in a vacuum-tight manner comprising a closure plate which, for the purpose of closing the closure device, is displaceable from an open position, in which the opening is released, to an intermediate position, in which it covers the opening but is raised from the wall, into a closed position in which it covers the opening and contacts the wall and, for the purpose of opening the closure device, is displaceable from its closed position to its intermediate position into its open position, a carrying unit which carries the closure plate and which has at least one longitudinal piston-cylinder unit by means of which the closure plate can be displaced in a closing direction from its intermediate position into its closed position and in an opening direction from its closed position into its intermediate position and which has a closing cylinder space for applying pressure to a closing piston surface by means of pressure gas in order to exert a force acting in closing direction and an opening cylinder space for applying pressure to an opening piston surface by means of pressure gas in order to exert a force acting in opening direction, a base unit which carries the carrying unit and has at least one transverse piston-cylinder unit by which the closure plate is displaceable in a closing direction from its open position to its intermediate position and in an opening direction from its intermediate position into its open position and which has a closing cylinder space for applying pressure to a closing piston surface by means of pressure gas in order to exert a force acting in closing direction and an opening cylinder space for applying pressure to an opening piston surface by means of pressure gas in order to exert a force acting in opening direction, wherein the closing cylinder space of the at least one longitudinal piston-cylinder unit is connected to the closing cylinder space of the transverse piston-cylinder unit or at least one of the transverse piston-cylinder units by means of a closing pressure gas channel, and the opening cylinder space of the at least one longitudinal piston-cylinder unit is connected to the opening cylinder space of the transverse piston-cylinder unit or at least one of the transverse piston-cylinder units by means of an opening pressure gas channel.

b) Description of the Related Art

A closure device of the type mentioned above is known from U.S. Pat. No. 6,056,266 A. To close the closure device, the closing cylinder spaces of the transverse and longitudinal piston-cylinder units are acted upon by pressure. However, the opening cylinder spaces are connected to atmospheric pressure. To open the closure device, the closing cylinder spaces and the opening cylinder spaces of the piston-cylinder units are acted upon by pressure gas, e.g., compressed air. Further, the closing piston surface is smaller than the respective opening piston surface in the transverse piston-cylinder unit as well as in the longitudinal piston-cylinder unit. This is achieved in the transverse piston-cylinder unit by a dual-action piston, wherein a guide rod having a greater diameter than the piston rod is arranged on the side of the piston located opposite from the piston rod. Two single-action pistons which have different diameters and are arranged in two portions of the cylinder bore hole which have different diameters are provided in the longitudinal piston-cylinder unit. A 3/2-way valve is used for switching between the open state of the closure device and the closed state of the closure device.

OBJECT AND SUMMARY OF THE INVENTION

It is the primary object of the invention to provide a closure device of the type mentioned in the beginning which has a simpler construction than the known closure device. According to the invention, this object is met by a closure device for closing an opening in a wall in a vacuum-tight manner comprising a closure plate which, for the purpose of closing the closure device, is displaceable from an open position, in which the opening is released, to an intermediate position in which it covers the opening but is raised from the wall, into a closed position in which it covers the opening and contacts the wall and, for the purpose of opening the closure device, is displaceable from its closed position to its intermediate position into its open position, a carrying unit which carries the closure plate and which has at least one longitudinal piston-cylinder unit by means of which the closure plate can be displaced in closing direction from its intermediate position into its closed position and in an opening direction from its closed position into its intermediate position and which has a closing cylinder space for applying pressure to a closing piston surface by means of pressure gas in order to exert a force acting in closing direction and an opening cylinder space for applying pressure to an opening piston surface by means of pressure gas in order to exert a force acting in opening direction, a base unit which carries the carrying unit and has at least one transverse piston-cylinder unit by which the closure plate is displaceable in a closing direction from its open position to its intermediate position and in an opening direction from its intermediate position into its open position and which has a closing cylinder space for applying pressure to a closing piston surface by means of pressure gas in order to exert a force acting in closing direction and an opening cylinder space for applying pressure to an opening piston surface by means of pressure gas in order to exert a force acting in opening direction, wherein the closing cylinder space of the at least one longitudinal piston-cylinder unit is connected to the closing cylinder space of the transverse piston-cylinder unit or at least one of the transverse piston-cylinder units by means of a closing pressure gas channel, and the opening cylinder space of the at least one longitudinal piston-cylinder unit is connected to the opening cylinder space of the transverse piston-cylinder unit or at least one of the transverse piston-cylinder units by means of an opening pressure gas channel, wherein the closing cylinder spaces and the opening cylinder spaces of the transverse piston-cylinder unit and longitudinal piston-cylinder unit are acted upon by pressure for closing the closure device, and only the opening cylinder spaces of the transverse piston-cylinder unit and longitudinal piston-cylinder unit are acted upon by pressure for opening the closure device, and the closing piston surface of the at least one transverse piston-cylinder unit is greater than the opening piston surface of the at least one transverse piston-cylinder unit, and the closing piston surface of the at least one longitudinal piston-cylinder unit is greater than the opening piston surface of the at least one longitudinal piston-cylinder unit, and the ratio between the closing piston surface and the opening piston surface of the at least one transverse piston-cylinder unit is greater than the ratio between the closing piston surface and the opening piston surface of the at least one longitudinal piston-cylinder unit.

By means of the construction according to the invention, the at least one transverse piston-cylinder unit can be constructed in a simple manner and no guide rod with a greater diameter than the piston rod is required on the side of the piston located opposite to the piston rod.

A dual-action piston can preferably be used for the at least one longitudinal piston-cylinder unit.

In an advantageous embodiment form of the invention, the closure device has a closing pressure gas connection and an opening pressure gas connection which are connected to a respective input of an OR-valve whose output is connected to the opening cylinder space of the transverse piston-cylinder unit or to the opening cylinder spaces of all of the transverse piston-cylinder units. At least one connection channel leading to the closing cylinder space of the transverse piston-cylinder unit advantageously proceeds from a pressure gas channel connecting the closing pressure gas connection to the OR-valve, or connection channels leading to the closing cylinder spaces of all of the transverse piston-cylinder units proceed from this pressure gas channel. Accordingly, a simple control of the closure device can be achieved in this way without requiring a 3/2-way valve.

Further advantages and details of the invention are described in the following with reference to the accompanying drawings which also present further objects of the invention.

BRIEF DESCRIPTION OF THE DRAWINGS

In the drawings:

FIG. 3 shows a side view of the closure device in the open state;

FIG. 4 shows a side view of the closure device in the closed state;

FIG. 5 shows a section along line A-A from FIG. 3;

DESCRIPTION OF THE PREFERRED EMBODIMENT EXAMPLES

Figure 1:
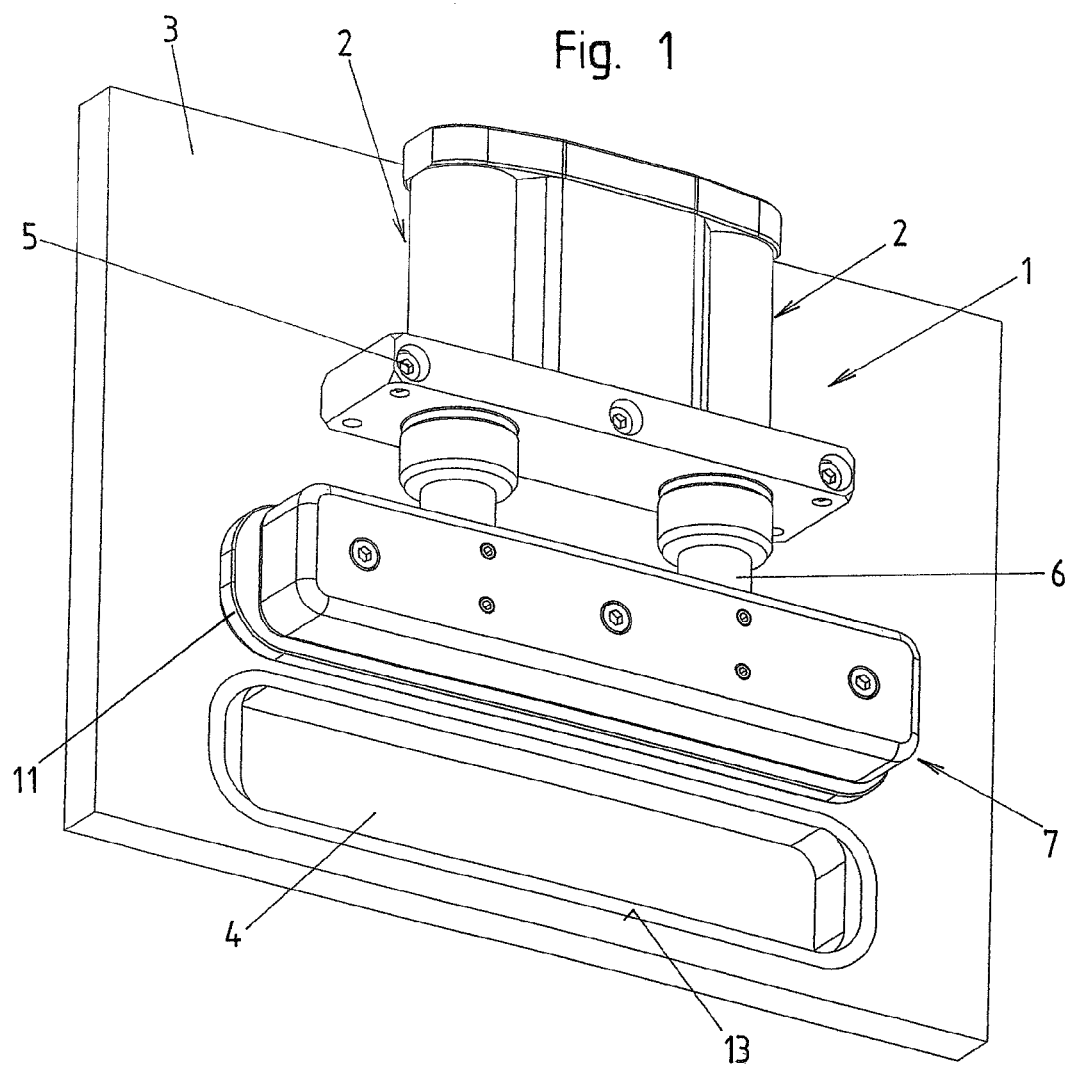
FIG. 1 shows an oblique view of a closure device according to the invention which is arranged at a wall having an opening, in the open state of the closure device.

In the embodiment of the invention shown in the drawings, the closure device has a base unit 1 which comprises two transverse piston-cylinder units 2. It would also be conceivable and possible to provide more or fewer transverse piston-cylinder units 2. The base unit 1 can be rigidly connected to the wall 3 having the opening 4 to be closed, for example, screwed to it by means of screws 5. In particular, the wall 3 can be the wall of a vacuum chamber. Closure devices of this type for openings in vacuum chambers are also called vacuum doors. The opening of a pipeline could also be closed by a closure device according to the invention. A closure device according to the invention could also be called a vacuum valve. Usually, closure devices are called valves when they can maintain a closure of the opening against differential pressures acting in two directions. A closure device according to the invention can also be designed for a differential pressure acting in only one direction (such closure devices are usually called 'doors').

A carrying unit 7 is arranged at the piston rods 6 of the transverse piston-cylinder units 2 and is supported in this way by the base unit 1 and can be displaced by the transverse piston-cylinder units 2 in direction transverse to the longitudinal axis 8 of the opening 4 as will be described more fully further below.

In the embodiment example shown herein, the carrying unit 7 comprises three longitudinal piston-cylinder units 9. It would also be conceivable and possible to provide more or fewer longitudinal piston-cylinder units 9.

A closure plate 11 is arranged at the piston rods 10 of the longitudinal piston-cylinder units 9. In this way, the closure plate 11 is carried by the carrying unit 7 and is displaceable in longitudinal direction of the longitudinal axis 8 of the opening 4 by the longitudinal piston-cylinder units 9.

In the open state of the closure device 1, the closure plate 11 is in its open position which is shown in FIGS. 1 to 3 and FIGS. 5 to 6. To close the closure device, the closure plate 11 is initially displaced by means of the transverse piston-cylinder units 2 transverse to, particularly at right angles to, the longitudinal axis 8 of the opening 4 (parallel to the plane of the wall 3) in a closing direction until it reaches an intermediate position in which it covers the opening 4 (viewed in direction of the longitudinal axis 8 of the opening) but is still raised from the wall 3 (not shown in the drawings).

Figure 7:
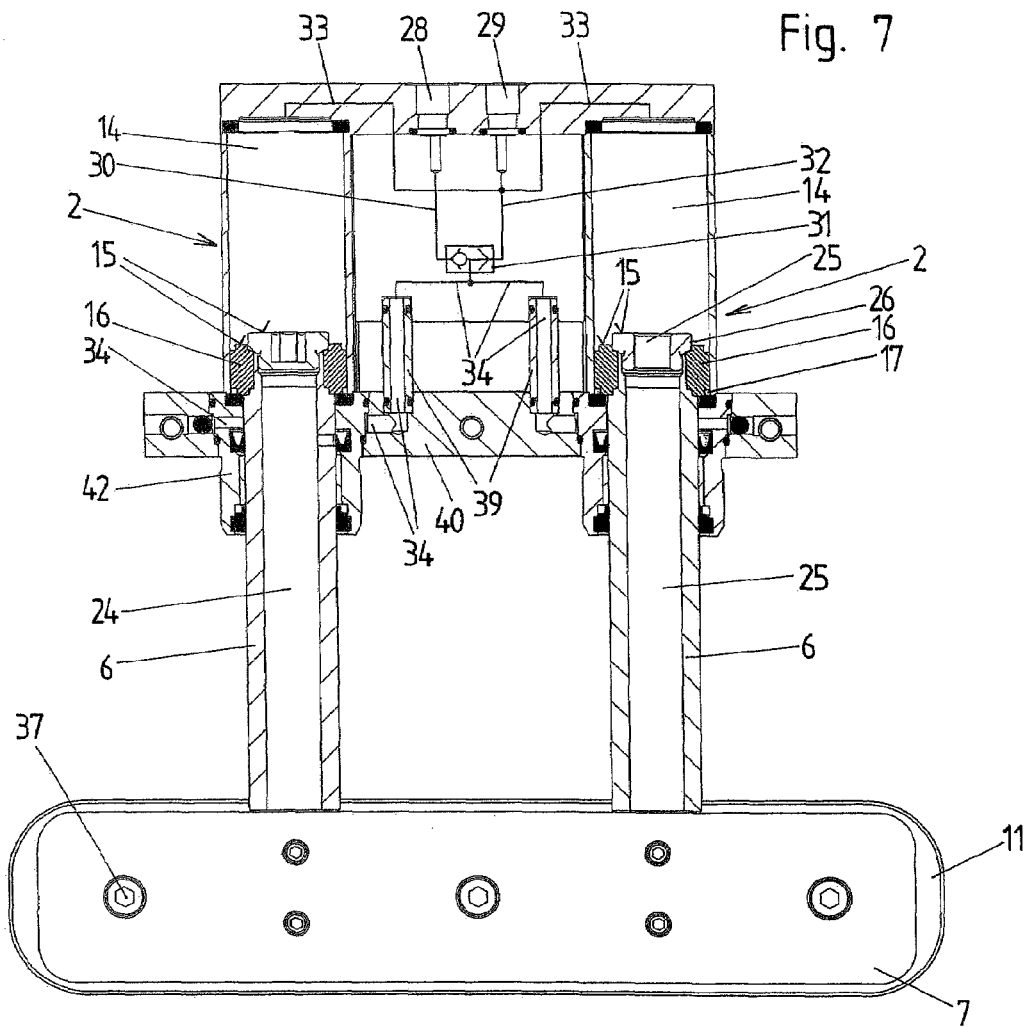
FIG. 7 and FIG. 8 show sections corresponding to FIGS. 5 and 6, but in the closed state of the closure device.
Figure 8:
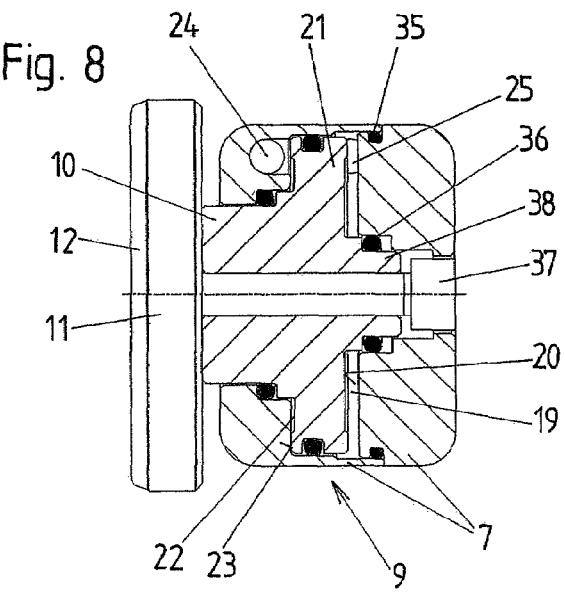

Proceeding from this intermediate position, the closure plate 11 is displaced by the longitudinal piston-cylinder unit 9 in a closing direction parallel to the longitudinal axis 8 of the opening 4 (perpendicular to the plane of the wall 3) until it reaches its closed position in which it contacts the wall 3 in the area around the opening 4. In so doing, a seal 12 of the closure plate 11 contacts a sealing surface 13 (see FIG. 1) surrounding the opening 4. The seal 12 could also be arranged at the wall 3 and the sealing surface 13 could be arranged at the closure plate 11. This closed state of the closure device is shown in FIG. 4 and FIGS. 7 to 8.

To open the closure device, this process is reversed. Accordingly, the closure plate 11 is first raised from the wall 3 in an opening direction extending parallel to the longitudinal axis 8 of the opening 4 and is moved into its intermediate position, namely by means of the longitudinal piston-cylinder units 9, and is moved subsequently in an opening direction extending transverse to the longitudinal axis 8 of the opening 4, particularly at right angles thereto, from its intermediate position into its opening position, namely by means of the transverse piston-cylinder units 2.

The closing and opening of the closure device is carried out by means of a pressure gas, for example, compressed air or compressed nitrogen.

In order to exert a force by means of the transverse piston-cylinder units 2 which acts in closing direction of these transverse piston-cylinder units 2, a closing cylinder space 14 of a respective transverse piston-cylinder unit 2 is acted upon by pressure gas so that pressure is applied to a closing piston surface 15 of the piston 16 of the transverse piston-cylinder unit 2. By supplying pressure gas to an opening cylinder space 17 of a respective transverse piston-cylinder unit 2, pressure is applied to an opening piston surface 18 of the piston 16 (see FIGS. 5 and 7).

The end pieces 26, 27 serve to hold the respective piston 16 on the piston rod 6 and, for this purpose, have an annular collar which projects outward and which is contacted by the piston 16 and are further provided with an external thread which is screwed into an internal thread of the piston rod 6. The end piece 27 is constructed so as to be closed in the manner of a cap and seals the interior space of the tubular piston rod 6. However, end piece 26 has a bore hole or is constructed as a pipe piece (the purpose of this construction will be explained further below). The fastening of the pistons 16 to the piston rods 6 could also be carried out in a different way.

The opening piston surface 18 is formed by the annular surface, preferably the circular annular surface, between the outer contour of the piston 16 and the outer contour of the piston rod 6. The closing piston surface 15 is defined by the surface bounded by the outer contour of the piston 16, which surface accordingly also extends over the end pieces 26, 27 and over the area of the bore hole in the end piece 26. Pressure gas in the closing cylinder space 14 exerts a force acting in closing direction over this entire surface so that this entire surface is, in effect, the closing piston surface 15 and is designated as such.

In order for the longitudinal piston-cylinder unit 9 to exert a force acting in its closing direction, pressure gas is supplied to a closing cylinder space 19 of a respective longitudinal piston-cylinder unit 9 so that a closing piston surface 20 of the piston 21 of the longitudinal piston-cylinder unit 9 is acted upon by pressure. To exert a force acting in the opposite, opening direction, an opening cylinder space 22 of a respective longitudinal piston-cylinder unit 9 is acted upon by pressure gas so that an opening piston surface 23 of the piston 21 is acted upon by pressure (see FIGS. 6 and 8).

In the embodiment example, the piston 16 of a respective transverse piston-cylinder unit 2 and the piston 21 of a respective longitudinal piston-cylinder unit 9 are accordingly constructed as dual-action pistons which are arranged, respectively, in a cylinder chamber of the piston-cylinder unit. The cylinder chambers of the transverse piston-cylinder units are formed by pipe-like parts. In the embodiment example, the cylinder chambers of the longitudinal piston-cylinder units are formed by cylindrical bore holes in the carrying unit 7. To move the piston 21 into these cylindrical bore holes, the carrying unit 1 is preferably constructed in two parts with a base part and a cover, which can be removed from the latter, a seal 35 being arranged between these two parts.

The fastening of the closure plate 11 to the piston rods 36 of the longitudinal piston-cylinder units is preferably carried out by means of fastening screws 37 which penetrate the pistons 21 and piston rods 10 and are accessible from the side of the carrying unit 7 located opposite to the closure plate 11. For this purpose, the carrying unit 7 has corresponding bore holes which are provided with continuations 38 on the side of the pistons 21 remote of the closure plate 11, these continuations 38 being sealed relative to the carrying unit 7 by seals 36.

Figure 2:
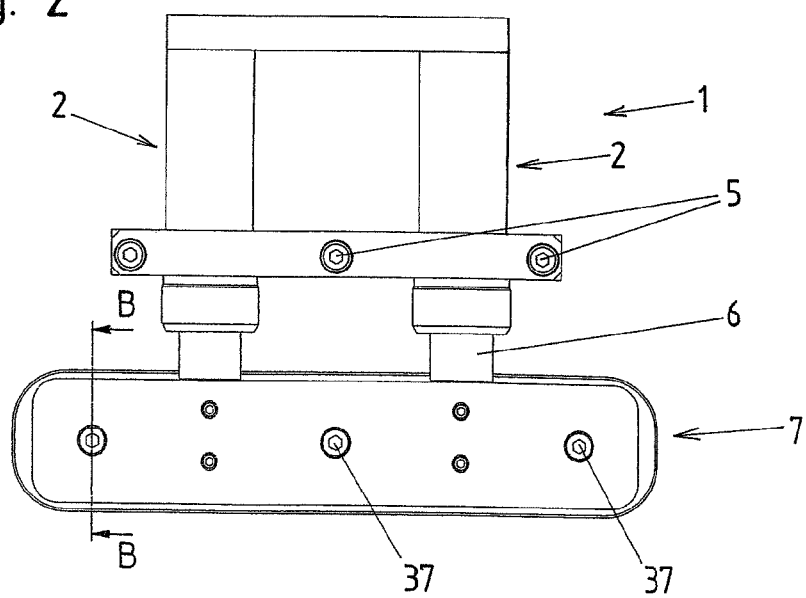
FIG. 2 shows a view of the closure device in the state shown in FIG. 1, without the wall.
Figure 6:
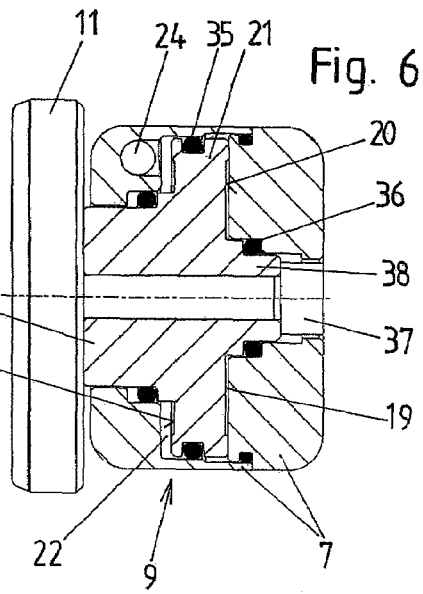
FIG. 6 shows a section along line B-B from FIG. 2.

The opening cylinder spaces 22 of the longitudinal piston-cylinder unit 9 are connected to the opening cylinder space 17 of the transverse piston-cylinder unit 2, shown at left in FIGS. 2, 5 and 7, by an opening pressure gas channel 24. This opening pressure gas channel 24 leads from the opening cylinder space 17 of the transverse piston-cylinder unit 2 through a bore hole in the wall of the tubular piston rod 6 into the interior cavity of this piston rod 6. This interior cavity of the piston rod 6 communicates with a transverse bore hole in the carrying unit 7 which forms another portion of the opening pressure gas channel 24 and communicates with the opening cylinder spaces of the longitudinal piston-cylinder unit 9. This transverse bore hole is shown in FIGS. 6 and 8.

The closing cylinder spaces 19 of the longitudinal piston-cylinder unit 9 are connected to the closing cylinder space 14 of the transverse piston-cylinder unit 2, shown at right in FIGS. 2, 5 and 7, by a closing pressure gas channel 25. This closing pressure gas channel 25 leads from the closing cylinder space 14 of the transverse piston-cylinder unit 2 through the above-mentioned bore hole in the end piece 26, which is arranged at the end of the piston rod 6 remote of the carrying unit 7, into the interior cavity of the tubular piston rod 6 of this transverse piston-cylinder unit 2. This inner cavity of the piston rod 6 communicates with a second transverse bore hole in the carrying unit 7 which forms another portion of the closing pressure gas channel 25 and communicates with the closing cylinder spaces 19 of the longitudinal piston-cylinder unit 9. This transverse bore hole forming a portion of the closing pressure gas channel 25 is partly visible in FIG. 8.

The closing piston surfaces 15 of the transverse piston-cylinder units 2 are larger than the opening piston surfaces 18 of the transverse piston-cylinder units 2. The closing piston surfaces 20 of the longitudinal piston-cylinder units 9 are larger than the opening piston surfaces 23 of the longitudinal piston-cylinder units 9.

The ratio between the closing piston surface 15 and the opening piston surface 18 of a respective transverse piston-cylinder unit 2 has a first value which is preferably identical for all transverse piston-cylinder units 2. The ratio between the closing piston surface 20 and the opening piston surface 23 of a respective longitudinal piston-cylinder unit 9 has a second value which is preferably identical for all of the longitudinal piston-cylinder units 9. The first value is greater than the second value. The first value is preferably at least 70% greater than the second value. In the present embodiment example, the first value is twice as great as the second value, and the ratio between the closing piston surface 15 and the opening piston surface 18 of a respective transverse piston-cylinder unit 2 is 8:3, and the ratio between the closing piston surface 20 and the opening piston surface 23 of a respective longitudinal piston-cylinder unit 9 is 4:3.

The closure device has an opening pressure gas connection 28 for opening it and a closing pressure gas connection 29 for closing it. A pressure gas channel 30, shown only schematically in FIGS. 5 and 7, leads from the opening pressure gas connection 28 to one of the inputs of an OR-valve 31, also shown schematically. A pressure gas channel 32, which is also only shown schematically in FIGS. 5 and 7, leads from the closing pressure gas connection 29 to the other of the two inputs of the OR-valve 31. Connection channels 33 which are likewise shown schematically and which open into the closing cylinder space 14 of the respective transverse piston-cylinder unit 2 branch off from this pressure gas channel 32. The output of the OR-valve 31 is connected by pressure gas channels 34 to the opening cylinder space 17 of a respective transverse piston-cylinder unit 2. The pressure gas channels 34 are shown schematically in FIGS. 5 and 7 in a first portion adjoining the OR-valve 31. This is followed by a portion extending in a pipe piece 39 and then by a portion extending in a bore hole of the part 40 of the base unit 1, which portion is connected by an annular groove 41 to a bore hole through the bushing 42 of the base unit 1.

OR-valves, or shuttle valves, are known. It is their function to convey pressure gas applied to one of the inputs to the output (but not to the other input). For example, it would be conceivable to realize an OR-valve with two inputs by means of two non-return valves. In a known manner, preferably only one closing element is provided, for example, a ball, which closes the respective pressureless input as is shown schematically in FIGS. 5 and 7.

In the open state of the closure device, the applied pressure gas is at system pressure in the opening cylinder spaces 17, 22 of the transverse piston-cylinder units 2 and longitudinal piston-cylinder units 9, and the closing cylinder spaces 14, 19 of the transverse piston-cylinder units 2 and longitudinal piston-cylinder units 9 are at atmospheric pressure, while in the closed state of the closure device the applied pressure gas is at system pressure in the closing cylinder spaces 14, 19 and opening cylinder spaces 17, 22 of the transverse piston-cylinder units 2 and longitudinal piston-cylinder units 9. In order to maintain the present state of the closure device in case of an interruption in pressure gas, non-return valves can be arranged in the pressure gas channels 30, 32 (in front of the connection channels 33).

When pressure gas is applied to the closing pressure gas connection 29 in the open state shown in FIGS. 5 and 6 (and the opening pressure gas connection 28 is connected to atmospheric pressure), the closing cylinder spaces 14, 19 of the transverse piston-cylinder units 2 and longitudinal piston-cylinder units 9 and the opening cylinder spaces 17, 22 of the transverse piston-cylinder units 2 and longitudinal piston-cylinder units 9 are acted upon by pressure. In the closing cylinder spaces 14, 19, which are without pressure in the open state of the closure device, the pressure increases until a lower threshold value is reached. At this lower threshold value, the force exerted on the closing piston surfaces 15 is great enough to move the pistons 21 of the transverse piston-cylinder units 2 in closing direction. On the other hand, for the longitudinal piston-cylinder units 9, the force exerted on the closing piston surfaces 20 is not yet sufficient to move the pistons 16 of these longitudinal piston-cylinder units 9 in closing direction. The pressure in the closing cylinder spaces 14, 19 substantially remains at this lower threshold value until the pistons 16 of the transverse piston-cylinder units 2 have reached their end position in which the closure plate 11 is in its intermediate position. Subsequently, the pressure continues to increase in the closing cylinder spaces 14, 19 to an upper threshold value at which the force exerted on the closing piston surfaces 20 of the longitudinal piston-cylinder units 9 is sufficiently large to move the pistons 21 of the longitudinal piston-cylinder units 9 in closing direction. The closure plate 11 is accordingly displaced from its intermediate position into its closed position in which it is pressed against the wall 3.

To open the closure device, the opening pressure gas connection 28 is acted upon by pressure gas and the closing pressure gas connection 29 is rendered pressureless (connected to atmosphere). When the pressure in the closing cylinder spaces 14, 19 of the transverse piston-cylinder units 2 and longitudinal piston-cylinder units 9 has dropped to approximately the above-mentioned upper threshold value, the pistons 21 of the longitudinal piston-cylinder units 9 begin to move in opening direction, and the pressure in the closing cylinder spaces 14, 19 remains approximately constant until the intermediate position of the closure plate 11 is reached. Subsequently, this pressure continues to drop until approximately the lower threshold value, whereupon the displacement of the pistons 16 of the transverse piston-cylinder units 2 in the opening direction begins.

The system pressure of the connected pressure gas can be, for example, in the range from 4 bar to 7 bar. The above-mentioned lower threshold value of the pressure can be, for example, between 1 bar and 2 bar, preferably about 1.5 bar. The above-mentioned upper threshold value of the pressure can be, for example, in the range between 2.5 bar and 3.5 bar, preferably about 3 bar.

As was already mentioned, more or fewer transverse piston-cylinder units or longitudinal piston-cylinder units can also be provided, for example, only one transverse piston-cylinder unit 2 and one longitudinal piston-cylinder unit 9. The above-described operating principle is the same.

It would also be conceivable and possible, for example, to guide the opening pressure gas channel 24 and closing pressure gas channel 25 through the same piston rod 6.

As follows from the preceding description, the range of the invention is not limited to the embodiment examples shown herein, but rather should be defined with reference to the appended claims together with their full range of possible equivalents. While the preceding description and drawings show the invention, it is obvious to a person skilled in the art that various modifications can be carried out without departing from the spirit of and field of the invention.

While the foregoing description and drawings represent the present invention, it will be obvious to those skilled in the art that various changes may be made therein without departing from the true spirit and scope of the present invention.

REFERENCE NUMBERS

| | Reference Numbers: |
|---|---|
| 1 | base unit |
| 2 | transverse piston-cylinder unit |
| 3 | wall |
| 4 | opening |
| 5 | screw |
| 6 | piston rod |
| 7 | carrying unit |
| 8 | longitudinal axis |
| 9 | longitudinal piston-cylinder unit |
| 10 | piston rod |
| 11 | closure plate |
| 12 | seal |
| 13 | sealing surface |
| 14 | closing cylinder space |
| 15 | closing piston surface |
| 16 | piston |
| 17 | opening cylinder space |
| 18 | opening piston surface |
| 19 | closing cylinder space |
| 20 | closing piston surface |
| 21 | piston |
| 22 | opening cylinder space |
| 23 | opening piston surface |
| 24 | opening pressure gas channel |
| 25 | closing pressure gas channel |
| 26 | end piece |
| 27 | end piece |
| 28 | opening pressure gas connection |
| 29 | closing pressure gas connection |
| 30 | pressure gas channel |
| 31 | OR-valve |
| 32 | pressure gas channel |
| 33 | connection channel |
| 34 | pressure gas channel |
| 35 | seal |
| 36 | seal |
| 37 | fastening screw |
| 38 | continuation |
| 39 | pipe piece |
| 40 | part |
| 41 | annular groove |
| 42 | bushing |

What is claimed is:

1. A closure device for closing an opening in a wall in a vacuum-tight manner, comprising:

a closure plate which, for the purpose of closing the closure device, is displaceable from an open position, in which the opening is released, to an intermediate position in which it covers the opening but is raised from the wall, into a closed position in which it covers the opening and contacts the wall and, for the purpose of opening the closure device, is displaceable from its closed position to its intermediate position into its open position;

a carrying unit which carries the closure plate and which has at least one longitudinal piston-cylinder unit by which the closure plate can be displaced in closing direction from its intermediate position into its closed position and in an opening direction from its closed position into its intermediate position and which has a closing cylinder space for applying pressure to a closing piston surface by pressure gas in order to exert a force acting in closing direction and an opening cylinder space for applying pressure to an opening piston surface by pressure gas in order to exert a force acting in opening direction;

a base unit which carries the carrying unit and has at least one transverse piston-cylinder unit by which the closure plate is displaceable in a closing direction from its open position to its intermediate position and in an opening direction from its intermediate position into its open position and which has a closing cylinder space for applying pressure to a closing piston surface by pressure gas in order to exert a force acting in closing direction and an opening cylinder space for applying pressure to an opening piston surface by pressure gas in order to exert a force acting in opening direction;

said closing cylinder space of the at least one longitudinal piston-cylinder unit being connected to the closing cylinder space of the transverse piston-cylinder unit, or of at least one of the transverse piston-cylinder units, by a closing pressure gas channel, and the opening cylinder space of the at least one longitudinal piston-cylinder unit being connected to the opening cylinder space of the transverse piston-cylinder unit, or of at least one of the transverse piston-cylinder units, by an opening pressure gas channel;

said closing cylinder spaces and the opening cylinder spaces of the transverse piston-cylinder units and longitudinal piston-cylinder units being acted upon by pressure for closing the closure device; and only the opening cylinder spaces of the transverse piston-cylinder units and longitudinal piston-cylinder units being acted upon by pressure for opening the closure device;

said closing piston surface of the at least one transverse piston-cylinder unit being greater than the opening piston surface of the at least one transverse piston-cylinder unit;

said closing piston surface of the at least one longitudinal piston-cylinder unit being greater than the opening piston surface of the at least one longitudinal piston-cylinder unit; and the ratio between the closing piston surface and the opening piston surface of the at least one transverse piston-cylinder unit being greater than the ratio between the closing piston surface and the opening piston surface of the at least one longitudinal piston-cylinder unit.

2. The closure device according to claim 1, wherein the closing pressure gas channel leads through a piston rod of the transverse piston-cylinder unit or one of the transverse piston-cylinder units.

3. The closure device according to claim 2, wherein the piston rod, through which the closing pressure gas channel leads, is tubular and the closing pressure gas channel leads through the open end of this piston rod remote of the carrying unit into the interior of this piston rod.

4. The closure device according to claim 1, wherein the opening pressure gas channel leads through a piston rod of the transverse piston-cylinder unit or of one of the transverse piston-cylinder units.

5. The closure device according to claim 4, wherein this piston rod of the transverse piston-cylinder unit is tubular and the opening pressure gas channel leads through a bore hole penetrating the wall of the piston rod into the interior of this piston rod.

6. The closure device according to claim 1, wherein the closing pressure gas channel and the opening pressure gas channel lead through piston rods of different transverse piston-cylinder units.

7. The closure device according to claim 1, wherein a portion of the closing pressure gas channel and a portion of the opening pressure gas channel are formed, respectively, by a transverse bore hole in the carrying unit.

8. The closure device according to claim 1, wherein the carrying unit, to form the longitudinal piston-cylinder unit or a respective longitudinal piston-cylinder unit, has a cylindrical chamber in which a dual-action piston is arranged and which delimits the opening cylinder space from the closing cylinder space.

9. The closure device according to claim 1, wherein the base unit, to form the transverse piston-cylinder unit or a respective transverse piston-cylinder unit, has a cylindrical chamber in which a dual-action piston is arranged and which delimits the closing cylinder space from the opening cylinder space.

10. The closure device according to claim 1, wherein the closure device has a closing pressure gas connection and an opening pressure gas connection which are connected to two inputs of an OR-valve whose output is connected to the opening cylinder space of the at least one transverse piston-cylinder unit.

11. The closure device according to claim 10, wherein at least one connection channel proceeds from a pressure gas channel connecting the closing pressure gas connection to the OR-valve and opens into the closing cylinder space of the at least one transverse piston-cylinder unit.

12. The closure device according to claim 1, wherein the ratio between the closing piston surface and the opening piston surface of the at least one transverse piston-cylinder unit is at least 70% greater than the ratio between the closing piston surface and the opening piston surface of the at least one longitudinal piston-cylinder unit.

* * * * *